United States Patent
Su et al.

(10) Patent No.: US 11,893,778 B2
(45) Date of Patent: Feb. 6, 2024

(54) METHODS AND SYSTEMS FOR CONTROLLING OPERATION OF ELONGATED MEMBER SPOOLING EQUIPMENT

(71) Applicant: Schlumberger Technology Corporation, Sugar Land, TX (US)

(72) Inventors: Tianxiang Su, Cambridge, MA (US); Muhannad Abuhaikal, Cambridge, MA (US); Christopher Bogath, Cambridge, MA (US); Vassilis Varveropoulos, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 476 days.

(21) Appl. No.: 17/175,238

(22) Filed: Feb. 12, 2021

(65) Prior Publication Data

US 2021/0164301 A1    Jun. 3, 2021

Related U.S. Application Data

(63) Continuation-in-part of application No. PCT/US2020/054763, filed on Oct. 8, 2020.
(Continued)

(51) Int. Cl.
*E21B 19/00* (2006.01)
*B66D 1/48* (2006.01)
(Continued)

(52) U.S. Cl.
CPC ......... *G06V 10/82* (2022.01); *B65H 75/4484* (2013.01); *B66D 1/485* (2013.01);
(Continued)

(58) Field of Classification Search
CPC ............... G06V 10/82; B65H 75/4484; B65H 2701/34; B66D 1/485; E21B 19/008; E21B 19/22; E21B 2200/09; E21B 2200/22
See application file for complete search history.

(56) References Cited

U.S. PATENT DOCUMENTS

| 5,767,671 A | 6/1998 | McCoy et al. |
| 9,213,120 B2 | 12/2015 | Kostov et al. |

(Continued)

FOREIGN PATENT DOCUMENTS

| EP | 0 573 656 B1 * | 2/2002 | ............. D03D 51/00 |
| JP | H02221068 A | 9/1990 | |

(Continued)

OTHER PUBLICATIONS

Canziani et al., "An Analysis of Deep Neural Network Models for Practical Applications", Apr. 2017, 7 pages. arXiv:1605.07678, available at: https://arxiv.org/pdf/1605.07678.pdf?source=post_page.

(Continued)

*Primary Examiner* — David F Dunphy
(74) *Attorney, Agent, or Firm* — Jeffrey D. Frantz

(57) ABSTRACT

A method of controlling operation of equipment that spools an elongated member on and off a rotatable drum, in one or more embodiments, includes obtaining video data of a position of the elongated member on the rotatable drum. The method can also include feeding data into a trained artificial neural network and processing the data fed into the trained artificial neural network to determine at least one of a calculated position of the elongated member on the rotatable drum, a calculated fleet angle, or both. The method can also include actuating the rotatable drum to one of spool elongated member on and off the rotatable drum.

20 Claims, 7 Drawing Sheets

Related U.S. Application Data

(60) Provisional application No. 62/913,007, filed on Oct. 9, 2019, provisional application No. 62/912,294, filed on Oct. 8, 2019.

(51) Int. Cl.
  *G06V 10/82* (2022.01)
  *B65H 75/44* (2006.01)
  *E21B 19/22* (2006.01)

(52) U.S. Cl.
  CPC ............ *E21B 19/008* (2013.01); *E21B 19/22* (2013.01); *B65H 2701/34* (2013.01); *E21B 2200/09* (2020.05); *E21B 2200/22* (2020.05)

(56) References Cited

U.S. PATENT DOCUMENTS

| | | | |
|---|---|---|---|
| 2001/0020663 A1* | 9/2001 | Petersen | F16P 3/141 |
| | | | 242/478.2 |
| 2003/0006332 A1 | 1/2003 | Appleby et al. | |
| 2003/0118230 A1 | 6/2003 | Song et al. | |
| 2006/0238934 A1 | 10/2006 | Kleine et al. | |
| 2010/0097450 A1 | 4/2010 | Pugh et al. | |
| 2010/0201970 A1 | 8/2010 | Pellen | |
| 2013/0044936 A1* | 2/2013 | Wang | G06T 7/136 |
| | | | 382/141 |
| 2013/0284434 A1 | 10/2013 | Marvel | |
| 2015/0256797 A1 | 9/2015 | Torben | |
| 2017/0115423 A1 | 4/2017 | Hori et al. | |
| 2021/0070590 A1 | 3/2021 | Iwashita et al. | |
| 2022/0144606 A1 | 5/2022 | Abuhaikal et al. | |

FOREIGN PATENT DOCUMENTS

| | | |
|---|---|---|
| WO | 2009047719 A2 | 4/2009 |
| WO | 2014068084 A1 | 5/2014 |
| WO | 2015082419 A1 | 6/2015 |
| WO | 2021072059 A1 | 4/2021 |

OTHER PUBLICATIONS

Carreira and Zisserman, "Quo Vadis, Action Recognition? A New Model and the Kinetics Dataset", CVPR, 2017, pp. 6299-6308. available at: https://openaccess.thecvf.com/content_cvpr_2017/papers/Carreira_Quo_Vadis_Action_CVPR_2017_paper.pdf.

Donahue et al., Long-term recurrent convolutional networks for visual recognition and description, CVPR, 2015, pp. 2625-2634, arXiv:1411.4389. available at: https://openaccess.thecvf.com/content_cvpr_2015/papers/Donahue_Long-Term_Recurrent_Convolutional_2015_CVPR_paper.pdf.

Gal, "Uncertainty in Deep Learning", Ph.D. Thesis, University of Cambridge, Sep. 2016, 174 pages.

International Search Report and Written Opinion issued in International Patent Application No. PCT/US2020/054763 dated Jan. 25, 2021; 9 pages.

Ioffe and Szegedy, "Batch Normalization: Accelerating Deep Network Training by Reducing Internal Covariate Shift", 2015, 11 pages.

Kading et al., "Fine-Tuning Deep Neural Networks in Continuous Learning Scenarios", ACCV 2016 Workshop on Interpretation and Visualization of Deep Neutral Nets, 2016, 17 pages. Available at: https://pub.inf-cv.uni-jena.de/pdf/Kading16_FDN.pdf.

Kingma and Ba, "Adam: A Method for Stochastic Optimization", ICLR 2015, Jan. 2017, 15 pages. Available at: https://arxiv.org/pdf/1412.6980.pdf?source=post_page.

Liu et al., "Dyan: A Dynamical Atoms-Based Network for Video Prediction", ECCV 2018, Sep. 2018, 16 pages. arXiv:1803.07201. Available at: https://arxiv.org/pdf/1803.07201.pdf.

Simonyan and Zisserman, "Two-Stream Convolutional Networks for Action Recognition in Videos", NIPS, 2014, 9 pages. Available at: https://papers.nips.cc/paper/2014/file/00ec53c4682d36f5c4359f4ae7bd7ba1-Paper.pdf.

Srivastava et al., "Dropout: A Simple Way to Prevent Neural Network from Overfitting", Journal of Machine Learning Research, vol. 15, 2014, pp. 1929-1958.

Xie et al., "Rethinking Spatiotemporal Feature Learning: Speed-Accuracy Trade-offs in Video Classification", 2018, 17 pages. arXiv:1712.04851. Available at: https://arxiv.org/pdf/1712.04851.pdf.

Zhu et al., "Hidden Two-Stream Convolutional Networks for Action Recognition", Oct. 2018, 16 pages. arXiv:1704.00389, Available at: https://arxiv.org/pdf/1704.00389.pdf.

Amundsen, "Elimination of free-surface related multiples without need of a source wavelet", Geophysics, vol. 66, No. 1, pp. 327-341, doi:10.1190/1.1444912.

Auken and Christiansen, "Layered and laterally constrained 2D inversion of resistivity data", Geophysics, vol. 69, No. 3, pp. 752-761.

Mehta et al., "Improving the virtual source method by wavefield separation", Geophysics, vol. 72, No. 4, 2007, pp. V79-V86.

Ravasi et al., "Seismic interferometry by multidimensional deconvolution without wavefield separation", Geophys. J. Int., 2015, vol. 202, 1-16, doi.org/10.1093/gji/ggv062.

Snieder, "Retrieving the Green's function from the response to a random forcing", Phys. Rev. E, 2006, vol. 74, 046620, 4 pages.

Van der Neut and Herrmann, "Interferometric redatuming by sparse inversion", Geophys. J. Int., 2013, vol. 192, pp. 666-670.

Wapenaar and Fokkema, "Green's function representations for seismic interferometry", Geophysics, 2006, vol. 71, No. 4, pp. SI33-SI46.

Wapenaar et al., "Tutorial on seismic interferometry. Part 1: basic principles and applications", Geophysics, 2010, vol. 75, No. 5, pp. A195-A209.

Wapenaar et al., "Tutorial on seismic interferometry. Part 2: underlying theory and new advances", Geophysics, 2010, vol. 75, No. 5, pp. A211-A227.

Wapenaar et al., "Seismic interferometry by crosscorrelation and by multi-dimensional deconvolution: a systematic comparison", Geophys. J. Int., 2011, vol. 185, pp. 1335-1364.

International Search Report and Written Opinion issued in PCT Application PCT/US2021/058721 dated Feb. 25, 2022, 9 pages.

International Preliminary Report on Patentability issued in International Patent Application No. PCT/US2020/054763 dated Apr. 21, 2022; 7 pages.

Li et al. 2018, Understanding the Disharmony between Dropout and Batch Normalization by Variance Shift (9 pages).

Office Action issued in U.S. Appl. No. 17/175,201 dated Nov. 7, 2022, 23 pages.

International Preliminary Report on Patentability issued in International Patent Application No. PCT/US2021/058721 dated May 25, 2023, 6 pages.

Office Action issued in U.S. Appl. No. 17/175,201 dated Jun. 16, 2023, 20 pages.

Extended Search Report issued in European Patent Application No. 20875050.5 dated Sep. 18, 2023, 6 pages.

\* cited by examiner

METHODS AND SYSTEMS FOR CONTROLLING OPERATION OF ELONGATED MEMBER SPOOLING EQUIPMENT

CROSS-REFERENCE TO RELATED APPLICATIONS

The current application is a Continuation-in-Part of International Patent Application PCT/US2020/054763, filed on Oct. 8, 2020, which claims priority to U.S. Provisional Application Ser. No. 62/912,294, filed Oct. 8, 2019 and U.S. Provisional Application Ser. No. 62/913,007, filed Oct. 9, 2019 the entirety of which are incorporated by reference.

FIELD OF THE DISCLOSURE

Aspects of the disclosure relate to control of deployment technology. More specifically, aspects of the disclosure relate to control of operations for spooling equipment used to deploy elongated members, such as cable, wireline, slickline, coiled tubing, or the like, for example, in hydrocarbon recovery operations.

BACKGROUND INFORMATION

Elongated members, such as wireline, coiled tubing, slickline, are used in oilfields to convey tools into a well. Some elongated members can also communicate signals between the deployed tool and surface-located equipment. During use, the elongated member can be spooled off the drum or spooled onto the drum by rotating the drum in opposite rotational directions. Conventional apparatus have difficulty spooling elongated members on a rotating drum in some instances. For example, the difficulties can arise from improper winding of the elongated member on the rotation drum such that gaps are left between successive passes of the elongated member on the drum.

There is a need to provide a method to control deployment equipment such that elongated member may be wound upon a rotating drum without interference to work flow activities.

There is a further need to provide a method that is economical to undertake without need for expensive alteration of conventional equipment.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment of a method is described. The method may comprise obtaining video data of a position of the elongated member on the rotatable drum, feeding data into a trained artificial neural network, processing the data fed into the trained artificial neural network to determine a quantity of the elongated member. The quantity of the elongated member can include a calculated position of the elongated member on the rotatable drum; a calculated fleet angle of the elongated member, or other know or unknown quantities of the elongated member. The method can also include actuating the rotatable drum to one of spool elongated member on and off the rotatable drum.

In another example embodiment, an apparatus is described. The apparatus comprises a rotatable drum configured to spool and elongated member on to and off of the rotatable drum; a video camera system configured to obtain video data of a position of the elongated member on the rotatable drum; and a trained artificial neural network to process video data of the drum to infer elongated member position on the drum.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments. It should also be noted that when the term "cable" is used in the figures that any elongated member can be used such as a cable, a wireline, a slickline, or a coiled tubing.

FIG. 5 also presents a last five frames that are "out-of-distribution" on which the elongated member is around the left flange and wherein outputs show a significantly larger variance.

Figure 1:
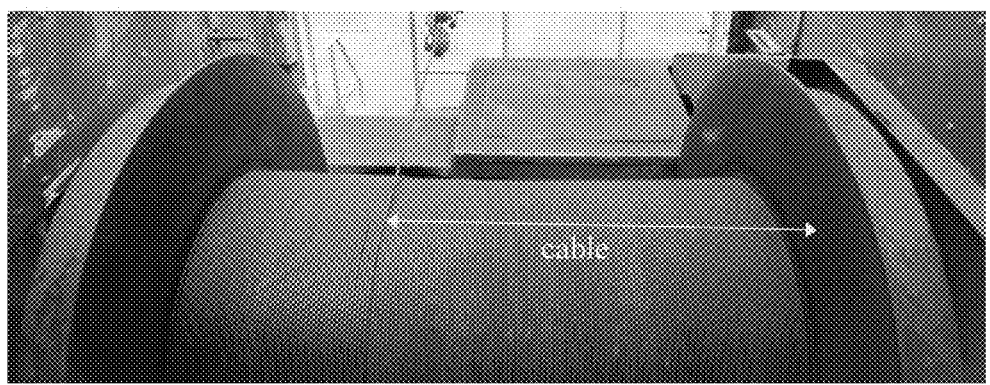
FIG. 1 is an image illustrating the term elongated member position as the location of an elongated member that comes into contact with a drum. In embodiments, the elongated member position can be measured away from a right flange of the rotating drum as viewed by the cabin.
Figure 2:
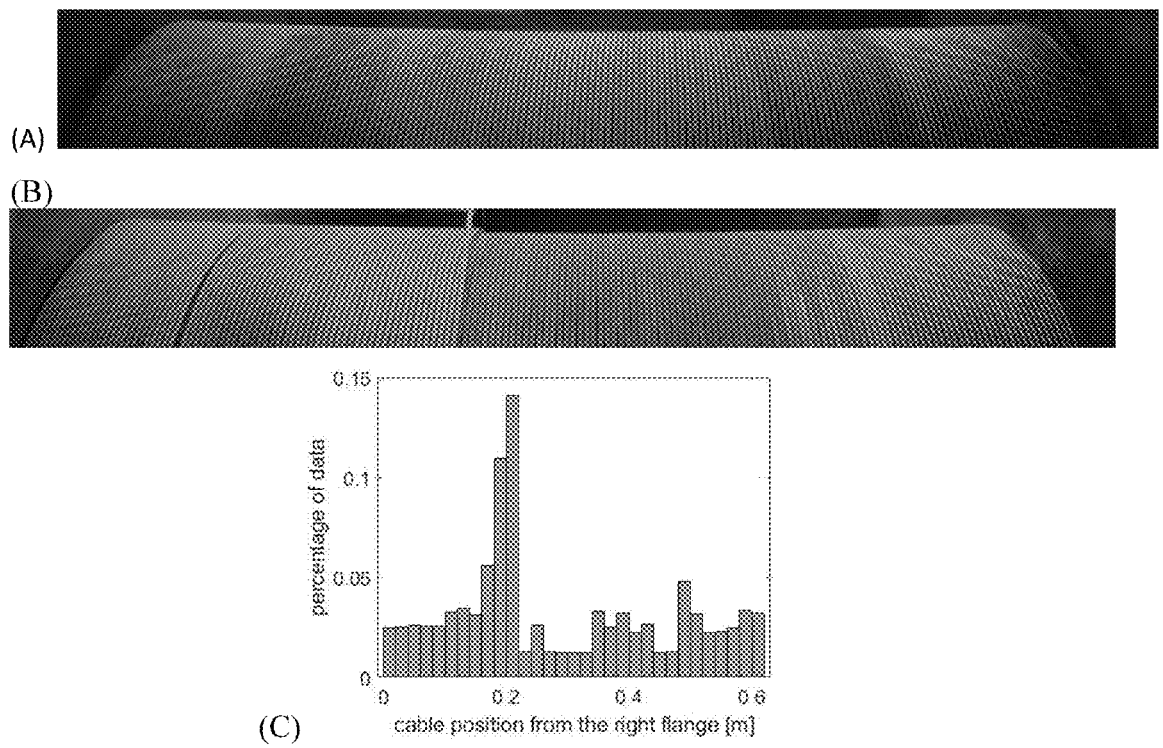
FIG. 2A is an example cropped video frame where the frame corresponds to a minimum elongated member position in a dataset.
FIG. 2B is another example video frame where the elongated member is between the two flanges.
FIG. 2C is a histogram distribution of the elongated member position in the dataset.
Figure 3:
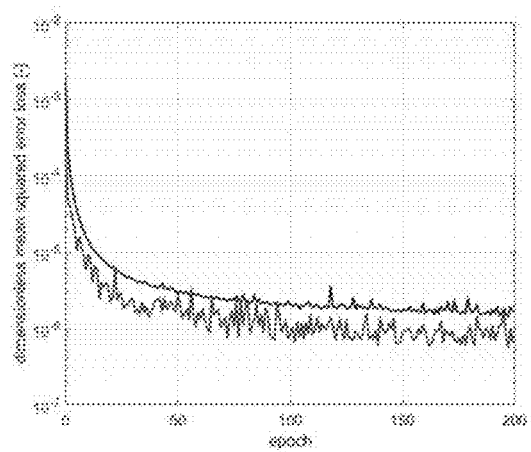
FIG. 3 is an illustration of network performance on training and validation sets, where mean-squared losses for the training sets (top line) and validation sets (bottom line) are illustrated during training.
Figure 4:
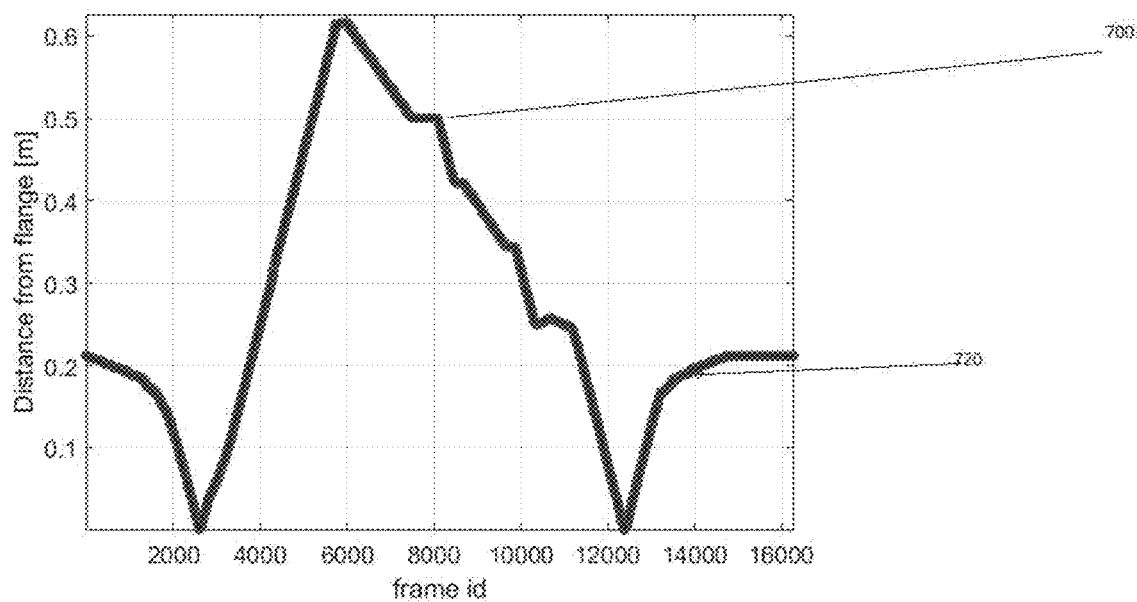
FIG. 4 is a graph of performance of a trained network illustrating a ground truth and raw model prediction hat are plotted against a video frame ID.
Figure 5:
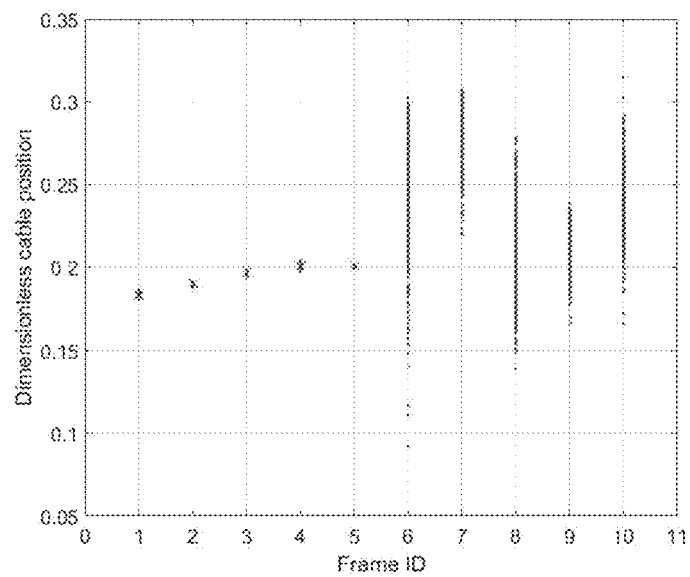
FIG. 5 is an illustration of "in-distribution" data frames on which ground-truth elongated member positions are away from the left flange locations and where model outputs have a low variance.
Figure 6:
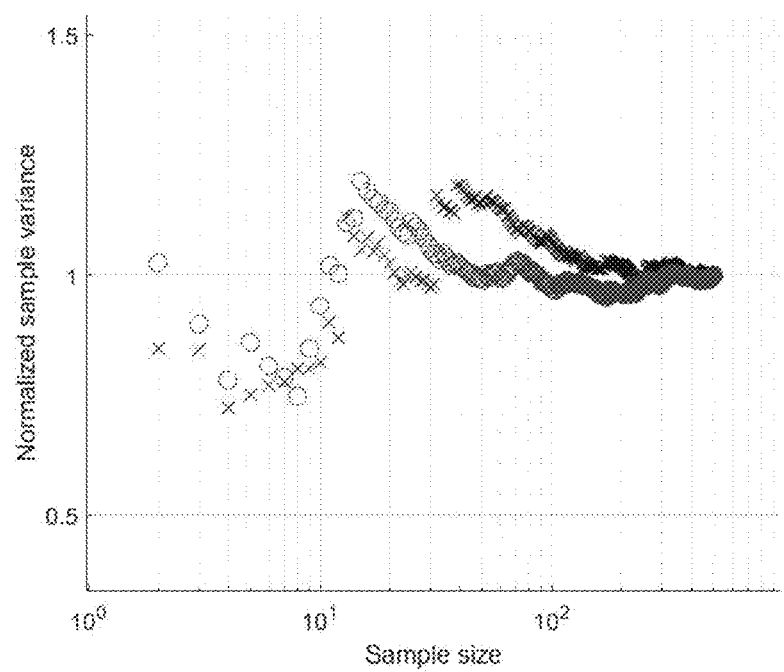
FIG. 6 is a graph of a normalized sample variance as a function of the sample size, wherein crosses are for "in-distribution" frames and circles are "out of distribution" frames.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the present disclosure is directed to an automated system (referred to as an Auto-Spooling Controller) that monitors and controls equipment that spools elongated members, such as a cable, a wireline, a coiled tubing, a slickline, or the like, on and off a rotatable drum. The equipment can include a guide member and a winch (e.g., hydraulic motor). The winch can be operated to rotate the drum in either one of the two opposite rotational directions to spool the elongated member on and off the rotatable drum. The guide member guides the elongated member as it is spooled on or off the drum. The position of the guide member can be adjusted to control the fleet angle of the elongated member as it is spooled on or off the drum. In embodiments, the Auto-Spooling Controller and the equipment can be housed in portable vehicle (such as truck) or trailer that can be transported to various well sites as needed.

As part of the Auto-Spooling Controller, the position of the elongated member is a required input parameter. It is also a parameter that can help classify the location-dependent spooling anomalies. A vision-based model is disclosed herein to estimate the elongated member position using a convolutional neural network. To train the network, ~45 k video frames of elongated member spooling were labeled with their corresponding ground-truth elongated member positions. A separate test set of ~16 k frames was used to quantify the network performance. Several arrangements and methods were reviewed with a best network that gives an average absolute error about 2 millimeters across a drum of 1 meter in length. No prediction post-processing (e.g., Kalman or moving average filters) was needed. To help fuse with other elongated member position estimation methods in the future, model uncertainty was quantified using the recently proposed Bayesian Dropout method.

In the Auto-Spooling Controller, the term "elongated member position" refers to the location of the elongated member that just comes in touch with the drum (Error! Reference source not found.). It is a dynamic parameter (i.e., changing with time during rotation of the drum) needed for the Auto-Spooling Controller to update the desired fleet angle. It is also a parameter that helps classify spooling anomalies. For example, with the knowledge that the current elongated member position is in the middle of the drum, one can infer with high confidence that there is no elongated member pileup at the flange (one common type of anomalies).

Elongated member position can be directly measured or indirectly inferred. For example, with a 3D camera, in one embodiment, a depth change of the elongated member on the drum may be measured, therefore locating the elongated member contact point. Also, with an initial estimate of the elongated member position, rotation information of the drum may be used together with the drum radius to update the current elongated member position. Both methods are being evaluated in parallel. The feasibility of using a neural network to estimate the elongated member position is clear. The input to the network is a video frame captured by a 2D camera mounted inside the truck cabin. The frame propagates through the network layers. The final layer is a single neuron unit outputting the predicted elongated member position measured from the right flange. The inference time are quantified and the prediction errors determined herein.

All data currently available is used (with ground-truth elongated member positions) to train and test a model. As will be understood, this data originates from a surface unit with similar lighting conditions and little camera pose changes. Thus, some variations may be present from configuration to configuration. In aspects that are deployable for the field, it will be understood that data may be configured to collect more data that covers different field conditions (drum and elongated member types, lighting conditions, etc.) and re-train the model.

The ground truth of the elongated member position is currently the elongated member position as estimated with a known method or future known methods. The elongated member position estimation in the POC controller uses the drum rotation and the layer direction in conjunction with manually-measured initial conditions.

A more robust stochastic version has been developed at SDR recently to estimate the elongated member position using the Layer Chart, which relies on the timeseries data to automatically determine the initial conditions and stochastically estimates the elongated member position.

Error! Reference source not found. (C) shows the histogram distribution of the elongated member position in the dataset. It ranges from 0.00 to 0.62 meter (distance from the right flange). Note that the drum length is L=1.054 meter.

The elongated member drum comes with different sizes, yet our training frames were recorded from the same drum. To reduce the risk of wrong prediction for a different drum, the frames were labeled with the dimensionless elongated member position normalized by the drum length.

Neural Network Design and Training

The video frames in the training set and their corresponding elongated member positions were used to train a convolutional neural network. The network architecture is shown in Table. We used (3×3) convolutional filters and performed (2×2) max pooling to down-sample the hidden layers. Rectified Linear Units (Relu) were used for nonlinear activations except for the last layer where we used a linear activation. A linear activation on the final layer is a common practice for a regression problem.

Dropout layers were used to regulate the network to reduce over-fitting [Srivastava N, et al. 2014]. We tested different dropout rates p, and found p=0.2 gives the best results. A higher dropout rate (e.g. p=0.5) scarifies the network performance on the training set (i.e., the error plateaus at a higher value), while a lower rate leads to poor performance on the validation set (over-fitting).

Other testing performed includes replacing the dropout layers with the batch normalization layers for network regulation [Ioffe S, et al. 2015]. No better results were obtained compared to those using dropouts. Combining the dropout layers with batch normalization was also experimented. Worse performance was obtained, which agrees with a recent study [Li et al. 2018].

TABLE 1

Architecture of the neural network. 3 by 3 convolutional filters were used followed by the 2 by 2 max pooling operations. The Rectified Linear Units (Relu) were used as activations, except for the last layer where we used a linear activation. Different dropout rates were tested for reducing over-fitting.

| ID | Layer | Size | Operation | Operation Parameter |
|---|---|---|---|---|
| 1 | Input Layer | (175 × 1000 × 1) | Convolution filter | (3 × 3 × 32) + relu |
| 2 | Convolution Layer 1 | (173 × 998 × 32) | Max Pooling | (2 × 2) |
| 3 | Max Pooling Layer 1 | (86 × 499 × 32) | Convolution filter | (3 × 3 × 32) + relu |
| 4 | Convolution Layer 2 | (84 × 497 × 32) | Max Pooling | (2 × 2) |
| 5 | Max Pooling Layer 2 | (42 × 248 × 32) | Convolution filter | (3 × 3 × 64) + relu |
| 6 | Convolution Layer 3 | (40 × 246 × 64) | Max Pooling | (2 × 2) |
| 7 | Max Pooling Layer 3 | (20 × 123 × 64) | Convolution filter | (3 × 3 × 64) + relu |
| 8 | Convolution Layer 4 | (18 × 121 × 64) | Max Pooling | (2 × 2) |
|  | Max Pooling Layer 4 | (9 × 60 × 64) | Flatten |  |
| 9 | Flatten layer | 34560 | Full Connection | 35,390,464 |
| 10 | Dense Layer 1 | 1024 | Activation + Dropout | Relu + 0.2 Dropout |
|  |  |  | Full Connection | 524,800 |
| 11 | Dense Layer 2 | 512 | Activation + Dropout | Relu + 0.2 Dropout |
|  |  |  | Full Connection | 32,832 |
| 12 | Dense Layer 3 | 64 | Activation | Relu |
|  |  |  | Full Connection | 65 |
| 13 | Dense Layer 4 | 1 | Final activation | linear |

The above network was fed with batches of training images of size 8. In embodiments, the mean-squared-error was used as the loss function and the Adam optimizer to update the network parameters [Kingma et al., 2014]. After testing some learning rates (lr), a value of lr=0.0001 was set (10 times smaller than the Keras default value). Other loss functions and optimizers, such as the mean-absolute error and the standard stochastic gradient descent (SGD) optimizer were also tested. These led to worse results.

The network was trained for 200 epochs (feeding the training set to the network 200 times). Each epoch took roughly 10 minutes on a compute engine on the Google Cloud Platform with two K80 GPUs.

Training Results and Prediction Errors

Error! Reference source not found. shows the mean-squared losses during training for the training (top curve) and the validation (bottom curve) sets. The performance on the validation set is better than that on the training set because of the dropouts in the network. A higher dropout rate p was found to result in a larger performance difference. For p=0.2, the error on the validation set plateaus around $10^{-6}$ after about 100 epochs, roughly corresponding to a 1 millimeter absolute prediction error (drum length×$\sqrt{10^{-6}}$).

Table 2 shows the average and maximum absolute prediction errors on the validation and the test sets. The results agree with the indications from the training log (Error! Reference source not found.). The average error is ~2 millimeters.

TABLE 2

Average and maximum absolute errors on the validation and the test sets.

|  | Validation set | Test set |
|---|---|---|
| Mean absolute error [meter] | 0.00063 | 0.0016 |
| Maximum absolute error [meter] | 0.0033 | 0.0081 |

In Error! Reference source not found, the ground truth was plotted (solid line 700) and raw neural network prediction 720 against the frame ID in the test video. The elongated member moves in between the right flange and a spot about 0.6 meter away. The network prediction matches the ground truth well for all frames. It should be emphasized that the dots 720 are the raw network outputs. Each frame was treated independently. The temporal information in the video was not considered. No post-processing (e.g., moving average nor Kalman filters) was performed here.

Uncertainty Quantification of the Neural Network Outputs

In the discussions above, the trained neural network outputs a deterministic elongated member position from an input video frame. No uncertainty information was extracted from the model. It is important to know how confident the described model is in its prediction. There are two reasons for this: (1) As discussed above, there are multiple methods to measure or infer the current elongated member position. To fuse these predictions, the confidence level is needed from each model output. (2) It is important to detect the so-called "out-of-distribution" data and alarm the system. An "out-of-distribution" data refers to a test data (a video frame for our case) that is outside the distribution of the training set. For example, given an image that is not related to wireline spooling, the trained network would still confidently propagate it through the network and blindly outputs a "elongated member position" value. Without uncertainty quantification, one would not know that this value is a pure random guess.

Before discussing how uncertainty is quantified, the neural network dropout operation is reviewed. In deep learning, "Dropout" refers to a method to add randomness to the network during the training phase. It was introduced and now widely used to tackle the over-fitting issue [Srivastava N, et al. 2014].

During training, a dropout operation randomly disables a neuron node with a user-defined dropout rate $p \in [0, 1]$. In the test phase, the dropout operation is deterministic. It scales the node output by the dropout probability. For example, a dropout rate $p=0.2$ will scale the output value deterministically by 80%.

The main advantage of this method is that it is straightforward to implement. Most networks nowadays use dropout layers (or other stochastic regularization techniques on which the same sampling method applies). One simply needs to switch on the training mode to obtain the posterior distribution.

This method is applied herein. It was first tested if the method can detect the "out-of-distribution" data points. Recall that in training sets, there is no frame on which the elongated member is near the left flange. Therefore, if such a frame were input to the network, a prediction with low confidence would be expected (i.e., high uncertainty and high variance in sampling the network outputs). In one embodiment 10 video frames were extracted. The first 5 frames were from an original test set ("in-distribution"). Another 5 frames were taken from some recently recorded videos which have the elongated member close to the left flange ("out-of-distribution"). While the ground-truth elongated member positions for these latter 5 frames were not precisely know, it is reasonable to estimate that the values should be close to 1 (because it is about 1 meter from the right flange). To sample the network outputs, the training mode was turned on and propagated each of these 10 frames into the network for 500 times. The variance of these samples is studied for each frame and the differences compared between the "in-distribution" and "out-of-distribution" frames.

In Error! Reference source not found, the output predictions were plotted. For the first 5 frames, the crosses are the ground-truth dimensionless elongated member positions, and the small dots are the sampled outputs (500 samples for each frame). The model is very confident in its prediction (small variance scattered around the average prediction) and the mean value is close to the ground truth. The average sample standard deviation for these 5 frames is $4.7 \times 10^{-4}$. For the rest 5 frames, the predictions are all wrong (true values should be close to 1). The large variance in the samples reflects the model uncertainty. The average sample standard deviation for these 5 frames is $2.2 \times 10^{-2}$ (~50 times larger than the first 5 frames). Such large sample variance can serve as a flag to alarm the system not to trust the model output.

Next, the number of how samples is evaluated such that a good estimate is obtained. Error! Reference source not found. shows the variance as a function of the sample size (blue crosses for the "in-distribution" 5 frames and red circles for the "out-of-distribution" frames). The figure shows that a sample size of 10 frames should be enough to get a good variance estimate.

To summarize, the following has been established from the embodiments run.

By using the network as if it was in the training mode, one can quantify the uncertainty in the model outputs.

When the test frame is "in-distribution", the trained model outputs samples close to the ground truth with an uncertainty in the order of $10^{-4}$.

A large sample variance can be used to detect an "out-of-distribution" video frame.

Strategy to speed up the time to calculate the variance is needed. For example, one can take advantage that the neighboring frames are similar to estimate the variance by using neighboring frames as sampling inputs.

As presented herein, neural network regression is used to estimate the Wireline elongated member position from a spooling video frame. By experimenting different network architectures and tuning the training parameters, an average absolute error about 2 millimeters across a drum of ~1 meter long without post-processing of the prediction was achieved. The Bayesian dropout method was applied to quantify the model uncertainty. These results are significantly better than conventional apparatus that do not accurately measure elongated member position.

Figure 7:
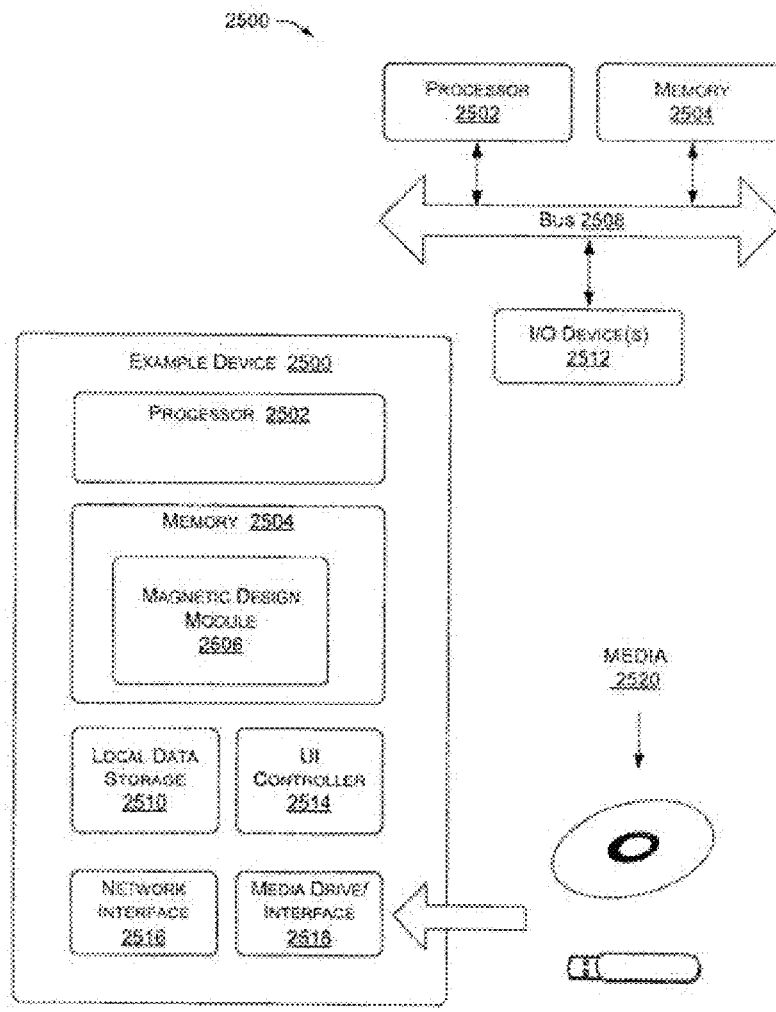
FIG. 7 is an example computer apparatus upon which the method described may operate.

FIG. 7 illustrates an example device 2500, with a processor 2502 and memory 2504 that can be configured to implement various embodiments of the Auto-Spooling Controller as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

In one or more embodiments, the system can also configured to used computer vision to control or assist in controlling the drum speed and position. For example, computer vision can be used to create a redundant drum position and speed measurement. For example, the system can use recurrent neural networks to learn and predict the motion of the drum, use Optical flow methods to extract the motion information from the frames, use feature tracking methods to track the rotation of the drum, or combinations thereof. In another embodiments, the system can use computer vision to estimate spooling arm angle using computer vision in a fashion identical to the elongated member position and the fleet angle estimations and it can be used as a redundant arm angle measurement. In one or more embodiments, the system can be configured to assist with wiper control for a deploy unit, such as a wireline truck or other unit wiper system. The system be in communication with an actuator that activates a windshield washer system. The windshield washer system can include a spay nozzle that is in communication with a pump and washer fluid reservoir. The windshield washer system can also include one or more wipers in communication with a drive system, such as an electric motor or the like. The control system can be configured to actuate the pump to spray washer fluid and also activate the wiper driver to cause the wiper to move to clear the fluid and debris from the window. The control system can be configured to issue the activation using computer vision that instruct the activation if the image is out of focus or response to other computer vision methods. The use of computer vision and setup would be known to one skilled in the art with the aid of this disclosure.

In one or more embodiments, stereoscopic vision/laser profilometer/optical tracking/depth camera can be used along with or instead of computer vision to perform one or more of the methods disclosed herein.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

In one example embodiment of a method is described. The method may comprise obtaining video data from a position of the elongated member on the rotatable drum, feeding data into a trained artificial neural network, processing the data fed into the trained artificial neural network to determine a calculated position of the elongated member on the rotatable drum and actuating the rotatable drum to one of spool elongated member on and off the rotatable drum.

In another example embodiment, the method may be performed, wherein the elongated member comprises a wireline elongated member that is configured to convey at least one wireline tool in a well.

In another example embodiment, the method may be performed, wherein the artificial neural network is performed on a processor.

In another example embodiment, the method may be performed, wherein the artificial neural network is configured to process frames across an entire width of the drum.

In another example embodiment, the method may be performed, wherein the processing of frames includes processing of in-distribution frames.

In another example embodiment, the method may be performed wherein the processing of frames includes processing of out-of-distribution frames.

In another example embodiment, the method may be performed, wherein an alarm is activated when out-of-distribution frames are processed.

In another example embodiment, the method may be performed, wherein a two dimensional camera is used to obtain video data.

In another example embodiment, the method may be performed, wherein a three dimensional camera is used to obtain video data.

In another example embodiment, the method may be performed, wherein the three dimensional camera is a 4 k video camera.

In another example embodiment, the method may further comprise outputting data to a user based upon predictions of elongated member placement on the drum.

In another example embodiment, an apparatus is described. The apparatus comprises, a elongated member; a rotatable drum configured to spool the elongated member on to and off of the rotatable drum; a video camera system configured to obtain video data of a position of the elongated member on the rotatable drum; and a trained artificial neural network to process video data of the drum to infer elongated member position on the drum.

In another example embodiment, the system may be configured wherein the elongated member comprises a wireline elongated member that is configured to convey at least one wireline tool in a well.

In another example embodiment, the system may be configured wherein the trained artificial neural network comprises a processor.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

All references, including publications, patent applications and patents, cited herein are hereby incorporated by reference to the same extent as if each reference were individually and specifically indicated to be incorporated by reference and were set forth in its entirety herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of controlling operation of equipment that spools an elongated member on and off a rotatable drum, the method comprising:
 obtaining video data of a position of the elongated member on the rotatable drum;
 feeding data into a trained artificial neural network;
 processing the data fed into the trained artificial neural network to determine at least one quantity of the elongated member; and
 actuating the rotatable drum to one of spool the elongated member on and off the rotatable drum,
 wherein the elongated member comprises a wireline elongated member that is configured to convey at least one wireline tool in a well.

2. The method according to claim 1, wherein the trained artificial neural network is performed on a processor.

3. The method according to claim 1, wherein the trained artificial neural network is configured to process frames across an entire width of the rotatable drum.

4. The method according to claim 3, wherein the processing of frames includes processing of in-distribution frames.

5. The method according to claim 4, wherein the processing of frames includes processing of out-of-distribution frames.

6. The method according to claim 5, wherein an alarm is activated when the out-of-distribution frames are processed.

7. The method according to claim 1, wherein a two dimensional camera is used to obtain the video data.

8. The method according to claim 1, wherein a three dimensional camera is used to obtain the video data.

9. The method of claim 1, wherein the at least one quantity of the elongated member comprises at least one of a calculated position of the elongated member on the rotatable drum, a calculated fleet angle, or both.

10. The method according to claim 1, further comprising:
 outputting data to a user based upon predictions of elongated member placement on the rotatable drum.

11. A system comprising:
 a rotatable drum configured to spool an elongated member on to and off of the rotatable drum, wherein the elongated member comprises a wireline that is configured to convey at least one wireline tool in a well;
 a video camera system configured to obtain video data of a position of the elongated member on the rotatable drum; and
 a trained artificial neural network to process video data of the rotatable drum to infer position of the elongated member on the rotatable drum.

12. The system according to claim 11, wherein the trained artificial neural network comprises a processor.

13. The system according to claim 11, wherein the trained artificial neural network is configured to process frames across an entire width of the rotatable drum.

14. The system according to claim 11, wherein the video camera system includes a three dimensional camera.

15. A method of controlling operation of equipment that spools an elongated member on and off a rotatable drum, the method comprising:
 obtaining video data of a position of the elongated member on the rotatable drum;
 feeding data into a trained artificial neural network, wherein the trained artificial neural network is configured to process frames across an entire width of the rotatable drum, wherein the processing of frames includes processing of in-distribution frames and out-of-distribution frames, and wherein an alarm is activated when the out-of-distribution frames are processed;
 processing the data fed into the trained artificial neural network to determine at least one quantity of the elongated member; and
 actuating the rotatable drum to one of spool the elongated member on and off the rotatable drum.

16. The method according to claim 15, wherein the trained artificial neural network is performed on a processor.

17. The method according to claim 15, wherein a two dimensional camera is used to obtain the video data.

18. The method according to claim 15, wherein a three dimensional camera is used to obtain the video data.

19. The method of claim 15, wherein the at least one quantity of the elongated member comprises at least one of a calculated position of the elongated member on the rotatable drum, a calculated fleet angle, or both.

20. The method according to claim 15, further comprising:
 outputting data to a user based upon predictions of elongated member placement on the rotatable drum.

* * * * *